(12) United States Patent
Park et al.

(10) Patent No.: US 9,300,014 B2
(45) Date of Patent: Mar. 29, 2016

(54) RECHARGEABLE BATTERY PACK

(75) Inventors: Kyung-Ho Park, Yongin-si (KR); Seok Koh, Yongin-si (KR); Seok-Ryun Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/615,099

(22) Filed: Sep. 13, 2012

(65) Prior Publication Data

US 2013/0122329 A1 May 16, 2013

(30) Foreign Application Priority Data

Nov. 14, 2011 (KR) .................. 10-2011-0118425

(51) Int. Cl.
*H01M 2/00* (2006.01)
*H01M 10/42* (2006.01)
*H01M 2/02* (2006.01)
*H01M 2/20* (2006.01)

(52) U.S. Cl.
CPC .......... *H01M 10/425* (2013.01); *H01M 2/0207* (2013.01); *H01M 2/202* (2013.01); *H01M 2200/00* (2013.01)

(58) Field of Classification Search
USPC .......................................................... 429/7
See application file for complete search history.

(56) References Cited

U.S. PATENT DOCUMENTS

| | | | | |
|---|---|---|---|---|
| 5,436,089 | A * | 7/1995 | Fedele .................. | 429/156 |
| 6,822,420 | B2 * | 11/2004 | Kozu et al. ............ | 320/107 |
| 7,714,542 | B2 | 5/2010 | Lee et al. | |
| 7,875,381 | B2 * | 1/2011 | Seo ...................... | 429/158 |
| 2008/0081249 | A1 * | 4/2008 | Kaneko ................ | 429/121 |
| 2011/0001456 | A1 * | 1/2011 | Wang .................... | 320/117 |

FOREIGN PATENT DOCUMENTS

| | | | |
|---|---|---|---|
| JP | 2002-100337 | 4/2002 | |
| JP | 2004-311402 | 11/2004 | |
| JP | 2007-098981 | * 4/2007 | ............ B60W 10/26 |

* cited by examiner

*Primary Examiner* — Ula C Ruddock
*Assistant Examiner* — Osei Amponsah
(74) *Attorney, Agent, or Firm* — Knobbe Martens Olson & Bear LLP

(57) ABSTRACT

A rechargeable battery pack may be used with a protection circuit module in common for serial or parallel connection of unit cells. The rechargeable battery pack may include a plurality of unit cells for forming a rechargeable battery by providing an electrode assembly to a pouch, a protection circuit module electrically connected to the unit cells, and a connector connected to the protection circuit module. The protection circuit module may include a serial protection circuit for electrically connecting the unit cells in series and a parallel protection circuit for electrically connecting the unit cells in parallel.

12 Claims, 6 Drawing Sheets

RECHARGEABLE BATTERY PACK

CROSS-REFERENCE TO RELATED APPLICATIONS

This application claims the benefit of priority of Korean Patent Application No. 10-2011-0118425, filed in the Korean Intellectual Property Office on Nov. 14, 2011, entitled "RECHARGABLE BATTERY PACK", the entire contents of which are incorporated by reference.

BACKGROUND

1. Field

Embodiments of the present disclosure relate generally to rechargeable battery packs, and further relate to rechargeable battery packs including a protection circuit module for a serial or parallel connection of a plurality of unit cells.

2. Description of the Related Art

A rechargeable battery can be used as a unit cell, or unit cells can be used by electrically connecting them with each other depending on the types of devices. For example, a rechargeable battery pack may include a unit cell, a protection circuit module (PCM) for protecting the unit cell, and a connector for connecting the protection circuit module to a device.

A plurality of unit cells may be coupled in series or parallel with each other to configure the rechargeable battery pack in a tablet type. The protection circuit module may be formed to be a single body and connected to the unit cells of the rechargeable battery pack. Therefore, the protection circuit module may configure a protection circuit for a serial electrical connection or a parallel electrical connection.

The above information disclosed in this Background section is only for enhancement of understanding of the background of the described technology and therefore it may contain information that does not form the prior art that is already known in this country to a person of ordinary skill in the art.

SUMMARY

Existing protection circuit modules are configured specifically for serial or parallel electrical connections and may only be used with rechargeable battery packs accordingly configured for either serial or parallel electrical connection of the unit cells. That is to say, in the case of a rechargeable battery pack in which the same number of unit cells are used, a protection circuit module configured for a serial electrical connection cannot be employed with unit cells in a parallel serial electrical connection and vice versa. Thus, a protection circuit module cannot be shared when the unit cells are connected in different ways. Accordingly, embodiments of the present disclosure provide rechargeable battery packs for use with a protection circuit module in common for serial or parallel connection of a plurality of unit cells.

In an embodiment a rechargeable battery pack is provided. The rechargeable battery pack may include: a plurality of unit cells for forming a rechargeable battery by providing an electrode assembly to a pouch, a protection circuit module electrically connected to the unit cell, and a connector connected to the protection circuit module. The protection circuit module may further include a serial protection circuit for connecting the unit cells in series and a parallel protection circuit for connecting the unit cells in parallel.

The protection circuit module may further include a switching unit for selectively connecting the serial protection circuit and the parallel protection circuit to the connector.

The unit cell may be configured to form a tablet shape.

The pouch may include a first cladding and a second cladding that are thermally fused by receiving the electrode assembly. A terrace may be is formed on one side where a lead tab connected to the electrode assembly is drawn out. The protection circuit module may be adhered to the terrace by using a double-sided adhesive tape.

The terrace may further include a vertical unit that is disposed closely between a terrace of one unit cell and a terrace of another unit cell from among neighboring unit cells.

The vertical unit may be formed to have a length that is less than about a width of a terrace that is set in a direction in which the lead tab is drawn out of the terrace.

The protection circuit module may form a concave groove corresponding to the vertical unit.

The switching unit may be formed to be a change-over switch that may be installed in the protection circuit module.

The connector may include a serial connector connected to the serial protection circuit and a parallel connector connected to the parallel protection circuit.

According to an embodiment, the protection circuit module may include a serial protection circuit and a parallel protection circuit. So configured, the protection circuit module may be employed for use with unit cells in serial electrical connection and parallel electrical connection.

In an embodiment, a rechargeable battery pack is provided. The rechargeable battery pack may comprise a plurality of battery unit cells configured to form a rechargeable battery. The rechargeable battery pack may further comprise a protection circuit module electrically connected to the plurality of unit cells. The protection circuit module may comprise a serial protection circuit for connecting the unit cells in series and a parallel protection circuit for connecting the unit cells in parallel. The rechargeable battery pack may additionally comprise a connector that is electrically connected to the protection circuit module.

The protection circuit module may further include a switching unit actuatable between a first configuration and a second configuration. The serial protection circuit may be electrically connected to the connector in the first configuration and the parallel protection circuit may be electrically connected to the connector in the second configuration.

The unit cell may be configured in a tablet shape.

The pouch may comprise a first cladding configured to receive the plurality of unit cells and a second cladding configured to cover the plurality of unit cells when received by the first cladding.

A lead tab may be in electrical communication with a selected unit cell of the plurality of unit cells and may extend outward from a side of the pouch receiving the selected unit cell.

A terrace may be formed in the pouch on the side of the pouch from which the lead tab extends. At least a portion of the protection circuit module may be attached to the terrace.

The rechargeable battery pack may further include a vertical unit that is interposed between a terrace of a first unit cell and a terrace of second unit cell adjacent to the first unit cell. The vertical unit may have a length that is less than a width of a terrace oriented in a direction in which the lead tab is drawn out of the terrace.

The protection circuit module may further comprise a groove configured to receive a portion of the vertical unit.

The switching unit may comprise a change-over switch that is installed in the protection circuit module.

The connector may include a serial connector that is electrically connected to the serial protection circuit and a parallel connector that is electrically connected to the parallel protection circuit.

DETAILED DESCRIPTION

Figure 1:
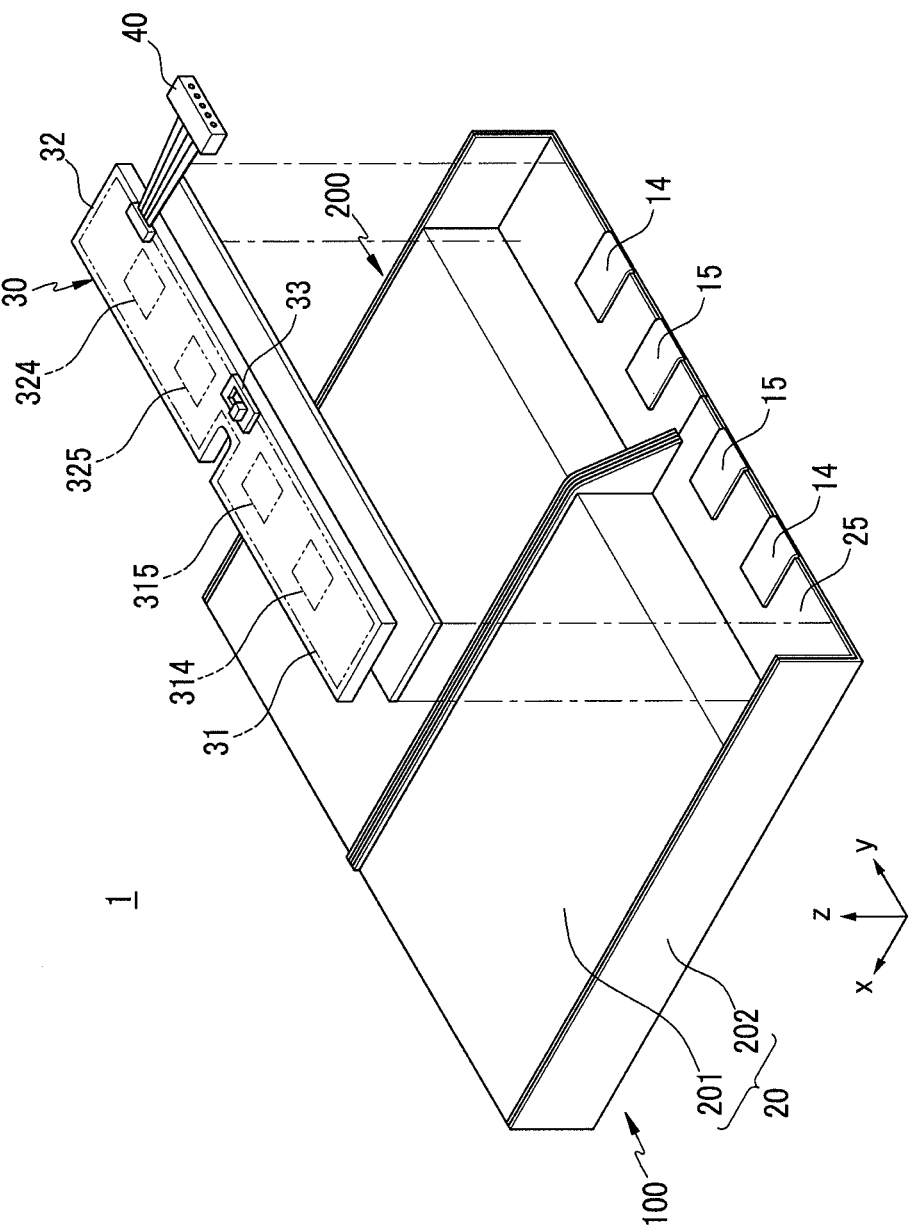
FIG. 1 shows an exploded perspective view of a rechargeable battery pack according to a first embodiment of the present disclosure.

Embodiments of the present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure. The drawings and description may be to be regarded as illustrative in nature and not restrictive. Like reference numerals may designate like elements throughout the specification.

Figure 2:
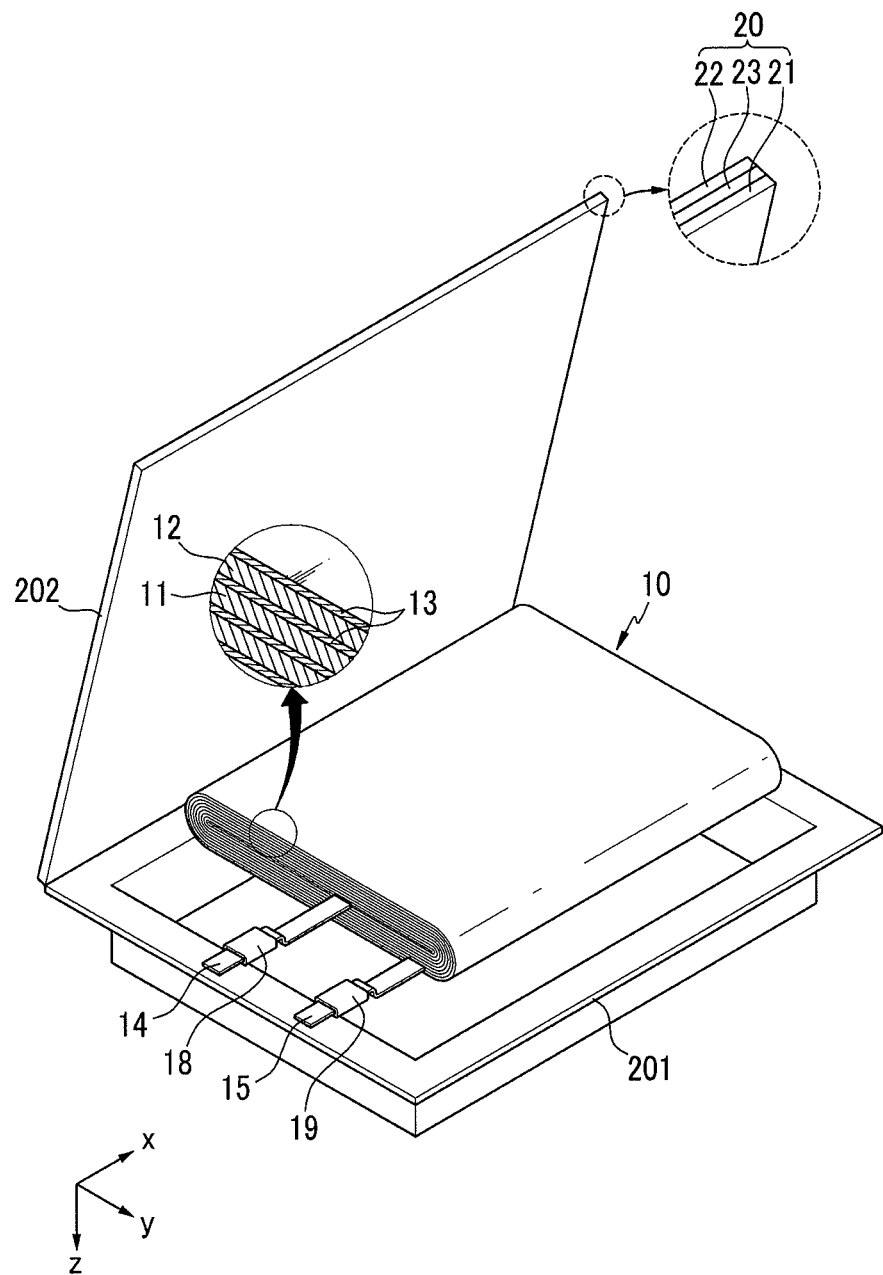
FIG. 2 shows an exploded perspective view of an embodiment of an electrode assembly and a pouch.

FIG. 1 shows a schematic, exploded perspective view of a rechargeable battery pack 1 according to a first embodiment of the present disclosure. FIG. 2 shows an exploded perspective view of an embodiment of an electrode assembly 10 and a pouch 20. Referring to FIG. 1 and FIG. 2, the rechargeable battery pack 1 may include a plurality of unit cells 100 and 200 for configuring a rechargeable battery, a protection circuit module 30 electrically connected to the unit cells 100 and 200, and a connector 40 connected to the protection circuit module 30.

The protection circuit module 30 may be formed with protection circuit elements so as to protect the unit cells 100 and 200 from overcharge, over-discharge, over-current, and external short, and combinations thereof.

The protection circuit module 30 may include a serial protection circuit 31 for coupling the unit cells 100 and 200 in series and protecting the same and a parallel protection circuit 32 for coupling the unit cells 100 and 200 in parallel and protecting them. The protection circuit module 30 may be formed to selectively use the serial protection circuit 31 or the parallel protection circuit 32 depending on a device (not shown) using the rechargeable battery pack 1. The serial protection circuit 31 and the parallel protection circuit 32 can be realized in various ways by using the skill in the art so their description will be omitted.

In an embodiment, the rechargeable battery pack 1 may include two unit cells 100 and 200, at least three unit cells, or an alternative number of unit cells, depending on the power requirement of the device. The unit cells 100 and 200 may be formed in a like manner, so the rechargeable battery may be described with reference to the unit cell 100. The unit cell 100 forming the rechargeable battery may include the electrode assembly 10 and the pouch 20 in which the electrode assembly 10 is installed.

The electrode assembly 10 may be formed in a jellyroll shape by disposing a first electrode (e.g., a positive electrode for convenience) 11 and a second electrode (e.g., a negative electrode for convenience) 12 with a separator 13 therebetween and spirally winding them. The separator 13 can be formed with a polymer solid electrolyte film for transmitting lithium ions.

In an alternative embodiment, the electrode assembly can be formed by stacking a positive electrode and a negative electrode configuring single plate with a separator therebetween (not shown).

In further embodiments, the electrode assembly can be formed to have a stacked structure by folding the positive electrode, the separator, and the negative electrode in a zigzag manner (not shown).

Figure 3:
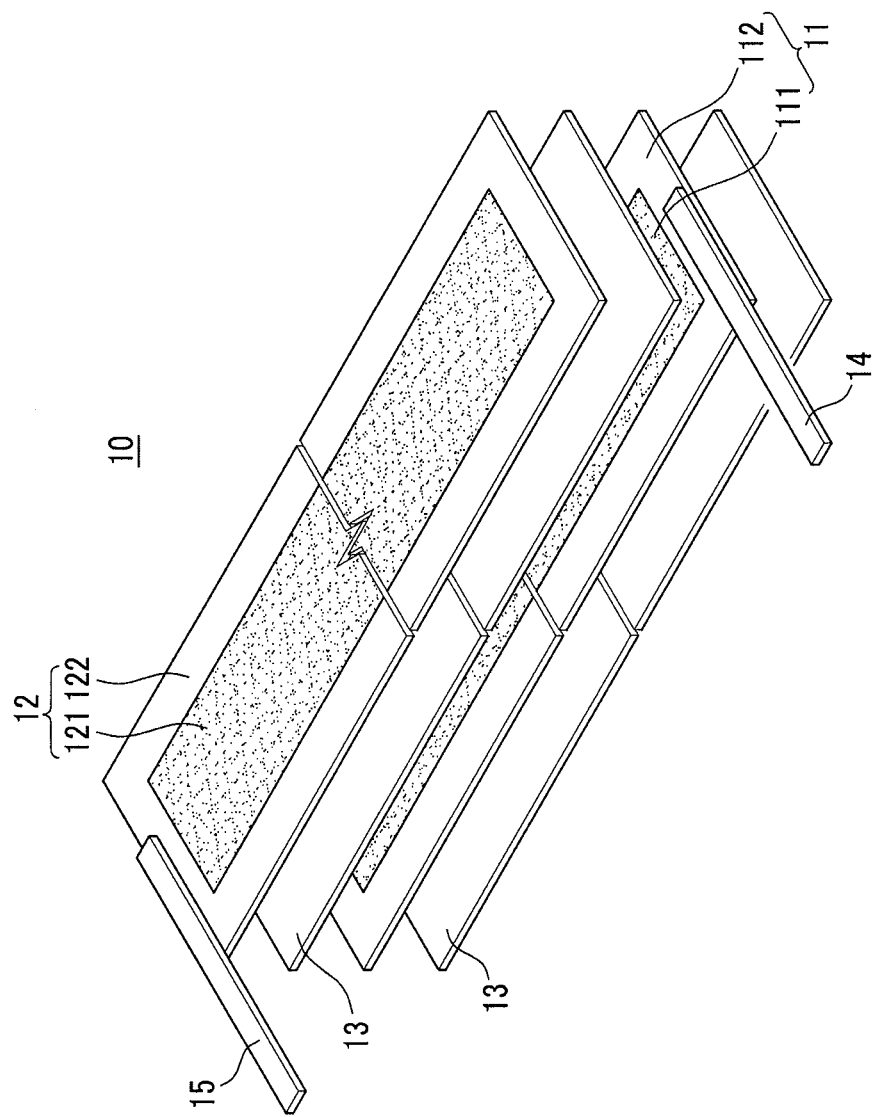
FIG. 3 shows an exploded perspective view of an electrode assembly.

FIG. 3 shows an exploded perspective view of an embodiment of an electrode assembly 10. Referring to FIG. 3, the positive electrode 11 may include a coated region 111 generated by coating an active material on a current collector made of a metallic thin film, and an uncoated region 112 that is not coated with the active material and is set to be an exposed region. A first lead tab (positive electrode lead tab hereinafter) 14 may be connected to the uncoated region 112 of the positive electrode 11.

The negative electrode 12 may include a coated region 121 generated by coating the active material of the positive electrode 11 or a different active material on the current collector made of a metallic thin film, and an uncoated region 122 on which the active material is not coated may be employed as an exposed region of the current collector. A second lead tab (e.g., a negative electrode lead tab hereinafter) 15 may be connected to the uncoated region 122 of the negative electrode 12 on the opposite side of the positive electrode lead tab 14.

In an embodiment, the positive electrode lead tab 14 and the negative electrode lead tab 15 may be drawn out on the same surface (e.g., the y-z plane) of the electrode assembly 10 and then disposed. In an alternative embodiment, the positive electrode lead tab 14 and the negative electrode lead tab 15 can also be disposed on opposite sides of the electrode assembly 10 (referring to FIG. 1, both ends in the direction of the x axis) of the electrode assembly 10, which is not shown.

Referring to FIG. 2, the pouch 20 can be formed as a multi-layered sheet surrounding the outer part of the electrode assembly 10. For example, the pouch 20 may include a polymer sheet forming an inner part 21, functioning as an insulator, and performing a thermal fusing operation. The pouch 20 may further include a polyethylene terephthalate (PET) sheet forming an outer part 22 and functioning as a protector. In alternative embodiments, the outer part 22 may be formed from a nylon sheet, a PET-nylon combined sheet, or other polymers, as necessary (the nylon sheet will be exemplified hereinafter). The pouch 20 may also include a metal sheet 23 providing mechanical strength. The metal sheet 23 may be provided between the polymer sheet 21 and the nylon sheet 22, and it can be formed to be an aluminum sheet. In alternative embodiments, however, the metal sheet 23 may be formed from other metals, as necessary.

Also, referring to FIG. 1 and FIG. 2, the pouch 20 may include a first cladding 201 for receiving the electrode assembly 10 and a second cladding 202 covering the electrode assembly 10. The second cladding 202 may be thermally fused on the first cladding 201 on the outer part of the electrode assembly 10. The first and second claddings 201 and 202 can be formed with the same-structured polymer sheet 21, nylon sheet 22, and metal sheet 23. In alternative embodiments, one or more of the polymer sheet 21, nylon sheet 22, and metal sheet 23 may be different between the first and second claddings 201 and 202.

In an embodiment, the first cladding 201 may be formed to be concave so that it may receive the electrode assembly 10, and the second cladding 202 may be formed to be approximately flat so that it may cover at least a portion of the electrode assembly 10 received by the first cladding 201.

In further embodiments, the electrode assembly 10 may be formed to be a tablet type so the pouch 20 may be formed to be a cuboidal tablet type. The unit cell 100 may substantially surround the electrode assembly 10 with the pouch 20 and may be a cuboidal tablet type.

The positive electrode lead tab 14 and the negative electrode lead tab 15 may be connected to the outside of the thermally fused pouch 20 to electrically draw the electrode assembly 10 out of the pouch 20. For example, the positive electrode lead tab 14 and the negative electrode lead tab 15 may be disposed between the first and second claddings 201 and 202 that are thermally fused by a terrace 25 that is formed on one side (e.g., the y-z plane) of the pouch 20. In this embodiment, the positive electrode lead tab 14 and the negative electrode lead tab 15 may be electrically insulated from the pouch 20 by insulating members 18 and 19 (refer to FIG. 2 and FIG. 5).

In further embodiments, the terrace 25 may be formed by thermally fusing an end of the first cladding 201 that is bent along the electrode assembly 10 on the flat, low surface of the facing second cladding 202 on the drawn out side of the positive electrode lead tab 14 and the negative electrode lead tab 15.

In an embodiment, the negative electrode lead tab 15 may be connected to the protection circuit module 30, and the positive electrode lead tab 14 may be further provided with a resistor element (not shown) having a positive temperature coefficient and may be connected to the protection circuit module 30. The resistor element may intercept a current on the positive electrode lead tab 14 when temperatures of the unit cells 100 and 200 reach a predetermined value. For convenience of description, the resistor element will be omitted in the first exemplary embodiment.

Referring to FIG. 1, in an embodiment, the connector 40 may be formed to be a single body to be electrically connected to the protection circuit module 30 and to electrically connect the rechargeable battery pack 1 to a device. In further embodiments, the protection circuit module 30 may include a switching unit 33 to selectively connect the serial protection circuit 31 and the parallel protection circuit 32 to the connector 40. For example, the switching unit 33 may be actuated between a first configuration and a second configuration in order to selectively connect either the serial protection circuit 31 or the parallel protection circuit 32 to the connector 40.

In a first embodiment, the switching unit 33 is placed into the first configuration, the protection circuit module 30 may electrically connect the serial protection circuit 31 to the connector 40. Furthermore, when the switching unit 33 is placed into the second configuration, the protection circuit module 30 may electrically connect the parallel protection circuit 32 to the connector 40. In certain embodiments, the switching unit 33 may be a mechanical switch, such as a change-over switch installed in the protection circuit module 30. When this change-over switch is actuated to the left or right (e.g., in the y-axis direction), the switching unit 33 may be placed into the first configuration or the second configuration.

Figure 4:
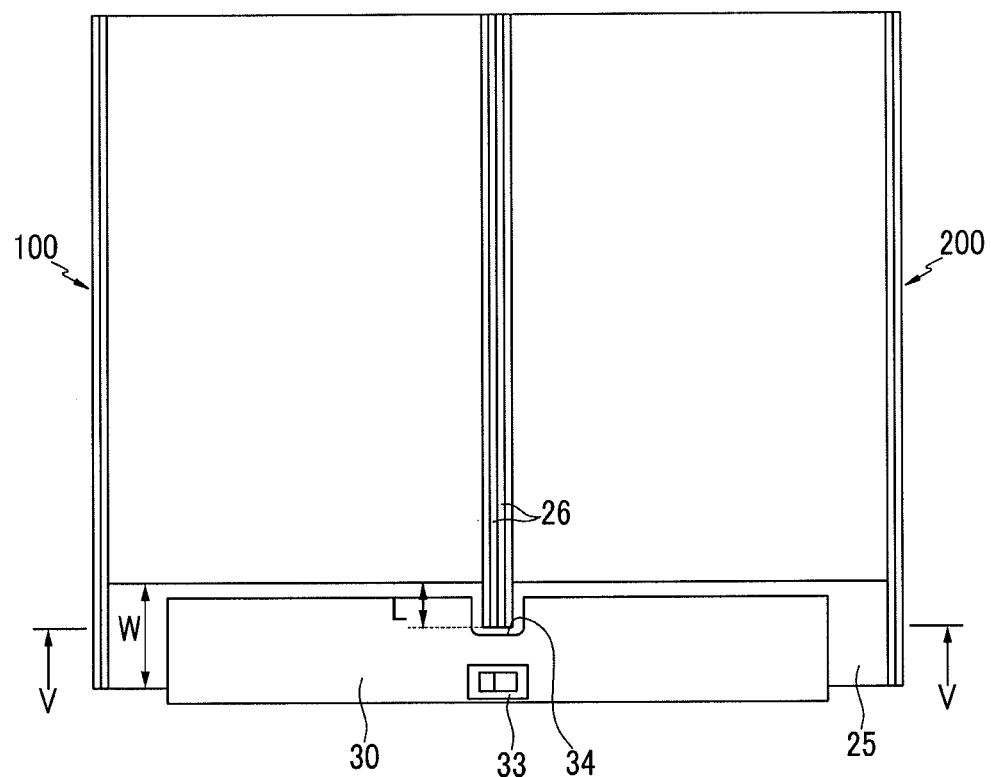
FIG. 4 shows a top plan view of the embodiment of FIG. 1.
Figure 5:
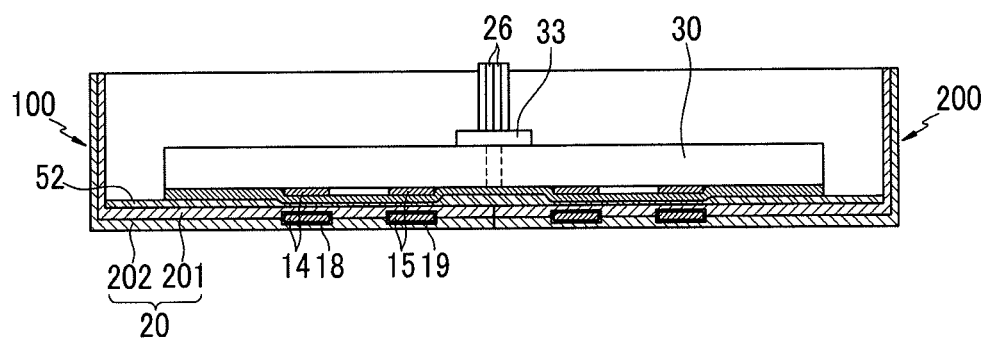
FIG. 5 shows a cross-sectional view with respect to a line V-V of the embodiment of FIG. 4.

FIG. 4 shows a top plan view of FIG. 1 and FIG. 5 shows a cross-sectional view with respect to a line V-V of FIG. 4. Referring to FIG. 1, FIG. 4, and FIG. 5, the protection circuit module 30 may be attached to the terrace 25 by using a fixing mechanism such as double-sided adhesive tape 51.

The terrace 25 may include a vertical unit 26 that is disposed closely between the terrace 25 of one unit cell 100 and the terrace 25 of the other unit cell 200 from among the neighboring unit cells 100 and 200.

The vertical unit 26 may be formed to have a lesser length (L) than a width (W) of the terrace 25 that is set in a direction (x-axis direction) in which the positive and negative electrode lead tabs 14 and 15 are drawn out from the terrace 25. That is, the vertical unit 26 may be installed on a part of the width (W) of the terrace 25 and the other part thereof may be maintained to be flat.

The protection circuit module 30 may form a concave groove 34 corresponding to the vertical unit 26. Therefore, in an embodiment, the protection circuit module 30 may be attached to the flat side of the terrace 25 by using a fixing mechanism such as double-sided adhesive tape 51 while the vertical unit 26 is received in the concave groove 34.

An insulating tape 52 may be further provided between the double-sided adhesive tape 51 and the flat side of the terrace 25 (as shown in FIG. 5), thereby further electrically insulating the gap between the protection circuit module 30 and the pouch 20.

In this embodiment, the positive and negative electrode lead tabs 14 and 15 of one unit cell 100 may be electrically connected to connectors 314 and 315 of the serial protection circuit 31 of the protection circuit module 20. The other unit cell 200 may be electrically connected to the parallel protection circuit 32 and connectors 324 and 325 of the protection circuit module 30.

The protection circuit module 30 may connect the serial protection circuit 31 and the parallel protection circuit 32 in a circuit manner to allow serial or parallel connection of the unit cells 100 and 200.

Figure 6:
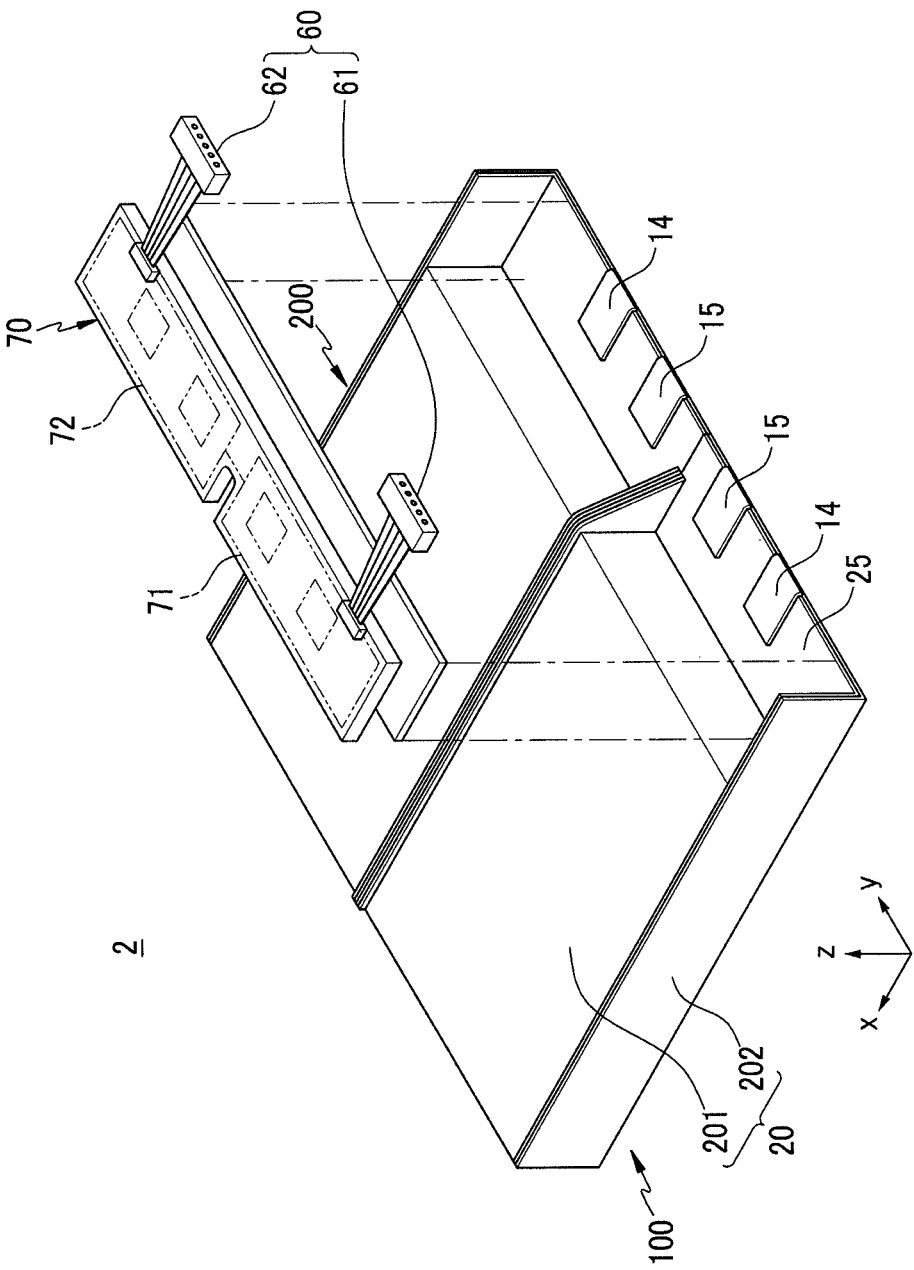
FIG. 6 shows an exploded perspective view of a rechargeable battery pack according to a second exemplary embodiment of the present disclosure.

FIG. 6 shows an exploded perspective view of a rechargeable battery pack 2 according to a second embodiment of the present disclosure. Referring to FIG. 6, a connector 60 may include a serial connector 61 connected to a serial protection circuit 71 and a parallel connector 62 connected to a parallel protection circuit 72.

The first embodiment may provide one connector 40 and the switching unit 33 to simplify the configuration of the connector 40. The second embodiment may provide the serial connector 61 and the parallel connector 62 to simplify the electrical circuit of a protection circuit module 70.

The protection circuit module 70 may electrically connected to the unit cells 100 and 200. The protection circuit module 70 may be further attached to the terrace 25 by using a fixing mechanism, such as double-sided adhesive tape 51. The protection circuit module 70 according to the second embodiment can selectively connect the serial connector 61 to a device or the parallel connector 62 to the device according to power requirement of the device.

The terms "approximately", "about", and "substantially" as used herein represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

While embodiments of the disclosure have been described in connection with what examples, it is to be understood that the disclosed embodiments are not limited to these examples. On the contrary, the disclosed embodiments may cover various modifications and equivalent arrangements included within the spirit and scope of the appended claims.

What is claimed is:

1. A rechargeable battery pack comprising:
a plurality of unit cells for forming a rechargeable battery by providing an electrode assembly to a pouch wherein the pouch defines a terrace and the terrace includes a vertical unit that is disposed on the terrace and that is disposed closely between a terrace of one unit cell and a terrace of another unit cell from among neighboring units cells and wherein the vertical unit is formed to have a length that is less than a width of a terrace that is set in a direction in which the lead tab is drawn out of the terrace and wherein the vertical unit extends in a first direction;
a protection circuit module electrically connected to the unit cells; and
a connector connected to the protection circuit module; wherein the protection circuit module includes:
a serial protection circuit for connecting the unit cells in series, and
a parallel protection circuit for connecting the unit cells in parallel wherein the protection circuit module further includes a switching unit for selectively connecting the serial protection circuit and the parallel protection circuit to the connector and wherein the switching unit is a manual switching unit that is positioned on an exposed surface of the protection circuit module mounted adjacent the vertical unit so as to be interposed between the serial protection circuit and the parallel protection circuit and so as to be aligned with the vertical unit in the first direction.

2. The rechargeable battery pack of claim 1, wherein the unit cell forms a tablet shape.

3. The rechargeable battery pack of claim 1,
wherein the pouch includes a first cladding and a second cladding that are thermally fused by receiving the electrode assembly,
wherein the terrace is formed on one side where a lead tab connected to the electrode assembly is drawn out, and
wherein the protection circuit module is adhered to the terrace by using a double-sided adhesive tape.

4. The rechargeable battery pack of claim 1, wherein the protection circuit module forms a concave groove corresponding to the vertical unit.

5. The rechargeable battery pack of claim 1, wherein the switching unit is formed to be a change-over switch that is installed in the protection circuit module.

6. The rechargeable battery pack of claim 1, wherein the connector includes:
a serial connector connected to the serial protection circuit; and
a parallel connector connected to the parallel protection circuit.

7. A rechargeable battery pack comprising:
a plurality of battery unit cells configured to form a rechargeable battery by providing an electrode assembly to a pouch wherein the pouch defines a terrace and the terrace includes a vertical unit that is disposed on the terrace and that is disposed closely between a terrace of one unit cell and a terrace of another unit cell from among neighboring units cells and wherein the vertical unit is formed to have a length that is less than a width of a terrace that is set in a direction in which the lead tab is drawn out of the terrace wherein the vertical unit extends in a first direction;
a protection circuit module electrically connected to the plurality of unit cells, wherein the protection circuit module comprises:
a serial protection circuit for connecting the unit cells in series, and
a parallel protection circuit for connecting the unit cells in parallel;
a connector that is electrically connected to the protection circuit module and wherein the protection circuit module further includes a switching unit actuatable between a first configuration and a second configuration, wherein the serial protection circuit is electrically connected to the connector in the first configuration and wherein the parallel protection circuit is electrically connected to the connector in the second configuration and wherein the switching unit is a manual switching unit that is positioned on an exposed surface of the protection circuit module and wherein the switching unit mounted adjacent the vertical unit so as to be interposed between the serial protection circuit and the parallel protection circuit and so as to be aligned with the vertical unit in the first direction.

8. The rechargeable battery pack of claim 7, wherein the unit cell is configured in a tablet shape.

9. The rechargeable battery pack of claim 7,
wherein the pouch comprises a first cladding configured to receive the plurality of unit cells and a second cladding configured to cover the plurality of unit cells when received by the first cladding;
wherein a lead tab in electrical communication with a selected unit cell of the plurality of unit cells extends outward from a side of the pouch receiving the selected unit cell;
wherein the terrace formed in the pouch on the side of the pouch from which the lead tab extends; and
wherein at least a portion of the protection circuit module is attached to the terrace.

10. The rechargeable battery pack of claim 7 wherein the protection circuit module further comprises a groove configured to receive a portion of the vertical unit.

11. The rechargeable battery pack of claim 7, wherein the switching unit comprises a change-over switch that is installed in the protection circuit module.

12. The rechargeable battery pack of claim 7, wherein the connector includes:
a serial connector that is electrically connected to the serial protection circuit; and
a parallel connector that is electrically connected to the parallel protection circuit.

* * * * *